(12) United States Patent
Euring et al.

(10) Patent No.: US 12,070,912 B2
(45) Date of Patent: Aug. 27, 2024

(54) USE OF EXPANDED AND HYDROPHOBIC POPCORN TO PRODUCE THREE-DIMENSIONAL SHAPED PARTS

(71) Applicant: Georg-August-Universität Göttingen Stiftung Öffentlichen Rechts, Göttingen (DE)

(72) Inventors: Markus Euring, Göttingen (DE); Alireza Kharazipour, Göttingen (DE)

(73) Assignee: GEORG-AUGUST-UNIVERSITÄT GÖTTINGEN STIFTUNG ÖFFENTLICHEN RECHTS, Göttingen (DE)

( * ) Notice: Subject to any disclaimer, the term of this patent is extended or adjusted under 35 U.S.C. 154(b) by 256 days.

(21) Appl. No.: 17/415,218

(22) PCT Filed: Dec. 10, 2019

(86) PCT No.: PCT/EP2019/084402
§ 371 (c)(1),
(2) Date: Jun. 17, 2021

(87) PCT Pub. No.: WO2020/126665
PCT Pub. Date: Jun. 25, 2020

(65) Prior Publication Data
US 2022/0040933 A1 Feb. 10, 2022

(30) Foreign Application Priority Data
Dec. 18, 2018 (DE) .......................... 102018132738.2

(51) Int. Cl.
*B29C 67/20* (2006.01)
*B29K 23/00* (2006.01)
*B29K 61/00* (2006.01)

(52) U.S. Cl.
CPC ........ *B29C 67/207* (2013.01); *B29K 2023/06* (2013.01); *B29K 2023/12* (2013.01); *B29K 2061/00* (2013.01)

(58) Field of Classification Search
None
See application file for complete search history.

(56) References Cited

U.S. PATENT DOCUMENTS

| 3,511,899 A | 5/1970 | Miller et al. |
| 3,630,821 A | 12/1971 | Miller et al. |
| 5,300,333 A | 4/1994 | Wilkerson et al. |
| 2010/0112339 A1* | 5/2010 | Kharazipour ............ B27N 3/00 428/326 |

FOREIGN PATENT DOCUMENTS

| DE | 19806951 A1 | 8/1999 |
| DE | 102006047279 A1 | 4/2008 |
| EP | 0777699 B1 | 6/1997 |
| WO | WO2012066111 A1 | 5/2012 |

OTHER PUBLICATIONS

Popcorn Kernels Unpopped—Nutrition Facts (Year: 2023).*

* cited by examiner

*Primary Examiner* — Robert T Butcher
(74) *Attorney, Agent, or Firm* — Patent Technologies, LLC; Robert D. Gunderman, Jr.

(57) ABSTRACT

The invention relates to shaped parts produced from popcorn which has previously been hydrophobised with a polymer. This allows very light and flexible shaped parts to be produced.

8 Claims, 2 Drawing Sheets

Figure 1:
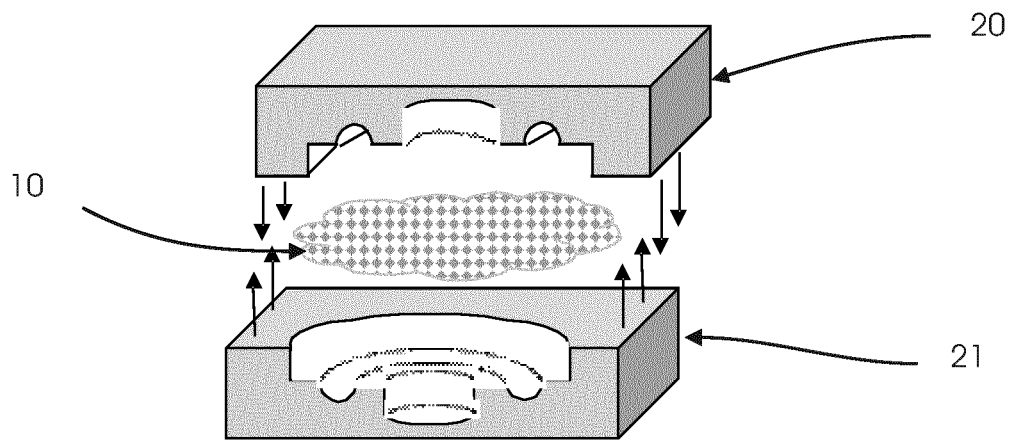

USE OF EXPANDED AND HYDROPHOBIC POPCORN TO PRODUCE THREE-DIMENSIONAL SHAPED PARTS

The present invention relates to the field of molded articles as used, for example, for packaging, in the automotive industry (interior and exterior), as sound absorbers, for thermal insulation or in the consumer goods industry. Such molded articles should be easy to produce and equally lightweight, and preferably consist entirely or partly of renewable raw materials.

Up to now, such molded articles have mainly been made of polypropylene, polyethylene, polyvinyl chloride and polystyrene, these molded articles from four families of plastics have numerous negative characteristics in addition to positive properties such as a low density, hydrophobic surface, good processability and low thermal conductivity.

On the negative side, the material is often very brittle and has only very low chemical resistance and softening temperature. Furthermore, the products made from these plastics often exhibited a very low melting temperature, which causes the plastic to melt and drip burning at temperatures little above 100° C. These drips can catch fire and contribute to fire spread. Flammability can be reduced by using suitable, but often very toxic, flame retardants. Up to now, brominated additives (polybrominated diphenyl ethers or hexabromo-cyclododecane), which are extremely harmful to the environment and health, have often been used.

Furthermore, these plastics are mostly made from finite fossil raw materials, some of which are difficult to recycle. The increase in plastic waste on laud and especially in the world's oceans is becoming an ever greater ecological problem with global significance. Incineration releases carbon dioxide, plastic particles enter the food chain and decomposition releases pollutants. Organizations such as the EU and UN point out that if economic growth continues and consumption patterns remain the same, environmental problems associated with plastic will continue to increase. Due to these health and environmental problems, which are generally known, the call for alternatives has recently become louder and louder.

The object is therefore to provide alternative molded articles and processes for their manufacture.

This object is solved by a molded article according to claim 1. Accordingly, a molded article is proposed containing popcorn which is essentially surrounded by polymer and optionally further binder, wherein the summed proportion of polymer and binder being ≤20% (w/w) based on the molded article.

"Essentially" as used in the present invention means a proportion of ≥95% (by weight), preferably ≥97%, still more preferably ≥99%. Thus, according to the present invention, the vast majority of the popcorn is surrounded by polymer.

Surprisingly, it has been found that in this way in a large number applications of the invention molded articles with good to excellent properties (including low thermal conductivity, excellent dimensional stability, outstanding sound absorption properties and low flammability) can be produced, which thus consists predominantly of renewable raw materials, namely the popcorn.

According to a preferred embodiment of the invention, the molded article comprises both polymer and binder.

According to a preferred embodiment, the molded article comprises or consists essentially of popcorn, polymer, and binder.

The term "popcorn" in the sense of the present invention includes in particular all materials which, like the puffed corn (*Zea mays*, convar. *Microsperma*)—if necessary after appropriate greasing—explode when heated to high temperatures quickly, in that the water present in the seed evaporates abruptly, thus converting the starch contained in the seed into a foam-like consistency. Such behavior is known, inter alia, from quinoa grain, amaranth, rice or even wheat, materials based on these basic materials are also explicitly referred to and encompassed as "popcorn" for the purposes of the present invention, the term "popcorn" is not intended to be limited to corn alone and was chosen in particular for reasons of simplicity, clarity and readability.

Preferably, the summed proportion of polymer and binder is ≤15% (w/w) based on the molded article, even more preferably ≤10% (w/w). A lower proportion of polymer and binder (where present) is advantageous, as this makes the molded article lighter and increases the proportion of renewable raw materials (=popcorn).

According to a preferred embodiment, the popcorn is used as a whole in the molding section, i.e., whole kernels and/or seeds are expanded and the popcorn is not subsequently used chopped (ground) or crushed.

According to an alternative and equally preferred embodiment, popcorn is used which has been produced from previously crushed starting materials (e.g. corn meal). If necessary, the expanded granules can be further comminuted before processing into molded articles.

Of course, embodiments in which both complete popcorn as treated according to the previous paragraph is used in the molded article are also advantageous.

According to a preferred embodiment of the invention, the fat content of the popcorn before processing is ≤10 (wt) %.

The "fat content" of the popcorn is not understood to mean the total amount of fat in the popcorn, but rather the amount of fat that has been used to hydrophobize the seed epidermis, which leads to better trapping of the water contained in the seed.

It has proven favorable in many applications within the present invention to keep this fat content as low as possible, since this facilitates further processing of the popcorn. Preferably, the fat content is ≤5 (wt) %, according to a particularly preferred embodiment, no fat is added for consistency change (transformation) (="puffing").

The popcorn used for the production of the three-dimensional molded articles is coated with a polymer after puffing. By "coated" it is meant that the individual popcorn particles are surrounded and/or enveloped by the polymer, which is composed of synthetic and/or biological components. Preferably, however, no or only little general bonding takes place, so that, for example, the popcorn is present as granules after coating and before further processing, i.e. it is pourable.

The polymer surrounding the popcorn is preferably a hydrophobic polymer. Preferred polymers are selected from the group comprising thermoplastics such as polypropylene, polyethylene, polyvinyl chloride, polystyrene, polyacrylate and thermosets, in particular condensed aminoplast resins. Furthermore, biologically based polymers such as polylactic acids (PLA), polyhydroxy acids such as polyhydroxybutyric acid or cellulose derivatives are suitable to coat the surface of the individual popcorn granules. The polymer can also consist of any mixture thereof.

Preferably, the proportion of polymer in the molded article (in % by weight based on the weight of the molded article) is ≤5%, preferably ≤3%.

According to a preferred embodiment of the invention, the molded article comprises a further binder. In particular, thermoplastics, thermosets, aminoplastics, phenoplastics, isocyanates, proteins, tannins, starch, synthetic binders or natural binders, or mixtures of binders can be used as binders, such as. For example, urea-formaldehyde resin, melamine-formaldehyde resin, melamine-reinforced urea-formaldehyde resin, tannin-formaldehyde resin, phenol-formaldehyde resin, polymeric diphenyl-methane-di-isocyanate or mixtures thereof are preferred.

Preferably, the proportion of binder in the molded article (in % by weight based on the weight of the molded article) is ≤10%, preferably ≤5%.

Preferably, the binder to polymer ratio (w/w) is of from ≥1:1 to ≤10:1, which has been found to be advantageous for many applications within the present invention. Preferably, the binder to polymer ratio is (in wt/wt) front ≥1.5:1 to ≤5:1.

The present object is further solved by a method according to claim 6. Accordingly, a method for manufacturing molded articles is proposed, comprising the steps:
a) Making popcorn
b) Optional hydrophobization of the popcorn produced in step a) by means of a polymer.
c) Optional after-treatment
d) Optional addition of binder
e) Production of the molded article
f) Optional coating of the molded article surface
g) Optional lamination.

This method preferably relates to molded articles as shown above, i.e., preferably the method is a method for producing the molded articles described above.

The individual steps of the method are explained in more detail below, whereby any sub-steps can be combined with others as desired.

a) Making Popcorn

Corn kernels can be made to expand by different methods.

According to a preferred embodiment of the invention, the popcorn used for the production of the molded articles is produced by puffing. Impending on the application, unmodified kernels can be used or suitable seeds, e.g. fodder corn kernels, are first ground and the kernel fragments are then expanded under the action of pressure and temperature according to the Bichsel process (WO 1999042005A1) a defined process. Other methods for buffering the starch-containing grains include hot plates, hot air machines and microwaves.

A preferred embodiment of the invention uses the so-called Cerex process from Cerex AG, CH-3368 Bleienbach. The process can be divided into three sections: Preheating element, reactor as well as expansion chamber. First, the corn kernels are uniformly heated to about 100° C. in the preheating element, then the corn is treated with superheated steam in the reactor, and at the end of the process the corn is ted into an expansion chamber. Here, the corn kernels (corn meal) are made to expand in a certain period of time by reducing the pressure. At the end, the puffed materials are collected and separated from the non-puffed components (Bichsel, n.d.). The conversion of corn meal to popcorn granules by the Cerex process is almost 100% in most applications, only less than 5% of the meal is not puffed.

Furthermore, prior to step b), the popcorn may be crushed again, so that according to a preferred embodiment of the invention, the process comprises a step a1) performed between step a) and b):
a1) Crushing the Puffed Popcorn Step a1) can be carried out using ail common manufacturing techniques.

b) Optional Hydrophobization by Means of Polymer

In step b), the popcorn is hydrophobized so that it ends up essentially surrounded by polymer. This can preferably be done by mixing the popcorn and spraying it with the polymer and/or precursors or a solution containing the polymer and/or precursors.

After the hydrophobization or coating process, a hydrophobic popcorn granulate that can be conveyed (e.g., pneumatically) and poured is preferably obtained. According to a preferred embodiment of the invention, the polymer is selected such that after hydrophobization it is possible to crosslink the coated popcorn granules c) Optional After-Treatment According to a preferred embodiment of the invention, step b) is followed by post-treatment of the resulting hydrophohized popcorn. Preferably, heating is performed to a temperature of ≥60 to ≤150° C.

This has proven to be advantageous in many applications, as it can further improve the hydrophobic properties of the resulting popcorn granules.

d) Optional Addition of Binder

Depending on the application, a further binder can be added. In particular, thermoplastics, thermosets, aminoplastics, phenoplastics, isocyanates, proteins, tannins, starch, synthetic binders or natural binders, or mixtures of binders can be used as binders, e.g. For example, urea-formaldehyde resin, melamine-formaldehyde resin, melamine-reinforced urea-formaldehyde resin, tannin-formaldehyde resin, phenol-formaldehyde resin, polymeric diphenyl-methane-di-isocyanate or mixtures thereof are preferred.

Preferably, the proportion of binder in the molded article (in % by weight based on the weight of the molded article) is ≤10%, preferably ≤5%.

The binder application can be applied according to any conventional mixing or flow process, e.g. by spraying the granules in various mixing units.

e) Production of the Molded Article

The molded article is preferably produced from the popcorn granules under slightly increased pressure and/or temperature.

Preferred pressures are ≥0.1 bar and ≤10 bar, preferably ≤5 bar, and most preferably ≤2 bar. Preferred pressing limes are ≥0.5 s/mm molded article and ≤24 s/mm molded article minute, preferably ≤8 s/mm molded article.

According to an alternative and equally preferred embodiment, the molded article is produced using steam curing or dry steam. Preferably, a temperature of ≥50° C. and ≤330° C., even more preferably ≥80° C. and ≤140° C. is used.

Dry steam is particularly preferred, and preferably the dry steam is produced from wet steam by means of a separator. Preferably, the temperature of the dry steam is between ≥120° C. and ≤220° C., still more preferably ≥160° C. and ≤290° C.

Two preferred techniques are used to produce the molded article as such:
a) Molding Presses This process is particularly preferred for slightly curved or flat components. The main field of application of this process is usually the automotive industry, packaging industry where it comes to the production of larger components with two-dimensional or three-dimensional structure.

At the start of the process, the molding compound, i.e. the popcorn surrounded by polymer with any additional binder, is introduced into a cavity and closed using a pressure piston. The molding compound acquires the shape specified by the mold as a result of the pressure. The molding compound present in the cavity is heated under pressure and conductive heat transfer by electrical heating of the cavity or by steam (dry steam if necessary). When thermosetting plastics are used as polymers, the temperature is usually used to influence the curing process; with thermoplastics, it is used to melt the plastic. The finished part can then be removed from the mold and, if necessary, reworked or further processed or coated or laminated (e.g. starch-based films or PU films).

b) Use of Automatic Molding Machines

This technique usually uses special molding machines that allow higher pressures and/or temperatures. The first process step is pneumatic compression of the molding compound (i.e. the popcorn surrounded by polymer with any additional binder) and filling of the closed special molding machine with the compressed molding compound. Alternatively, the molding compound can also be conveyed into the cavity by a vacuum. With the aid of temperature and pressure, the molding compound is brought to the desired curing temperature, for example by means of steam (dry steam if necessary), thereby completely crosslink mg the polymer, depending on the application. The above-mentioned media can flow through the molding compound on one side, alternately or from all sides. After the popcorn particles have been crosslinked or fused together, the molded article is removed from the mold part in the final process step. The molded articles can then be coated or laminated (e.g. starch-based films, PU films or PLA films, flocking).

f) Optional Coating of the Molded Article Surface

Depending on the application, the molded article surface can also be coated, e.g. by applying paints, for example by means of lacquering. The surface of the molded article can also be flocked, and depending on the application, it can also be advantageous if a further impregnation layer is applied.

g) Optional Lamination

Depending on the application, however, lamination can also be carried out alternatively or additionally. The usual laminating agents such as varnish, glue or wax can be used.

The molded articles according to the invention and/or the molded articles produced according to the method according to the invention can be used in a variety of applications, including (but not limited to):

Packaging materials (e.g., coolers, protective packaging for electrical appliances, spice jars, etc.), automotive parts (e.g., headrests, sun visors, child seat shells, insulating mats for interior door panels and motorhome cabin linings), insulating materials (e.g. electrical appliances), tableware, sporting goods (e.g. yoga roils, neck rolls), toys (e.g. disc, boards for board games, puzzles), picture frames, gift baskets, composite acoustic moldings, RV parts, etc.

The above-mentioned components as well as those claimed and described in the embodiment examples to be used according to the invention are not subject to any special exceptional conditions in their size, shape design, material selection and technical conception, so that the selection criteria known in the field of application can be applied without restriction.

Figure 2:
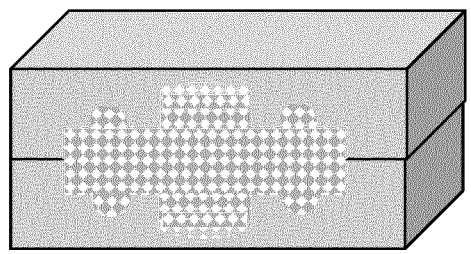
Figure 3:
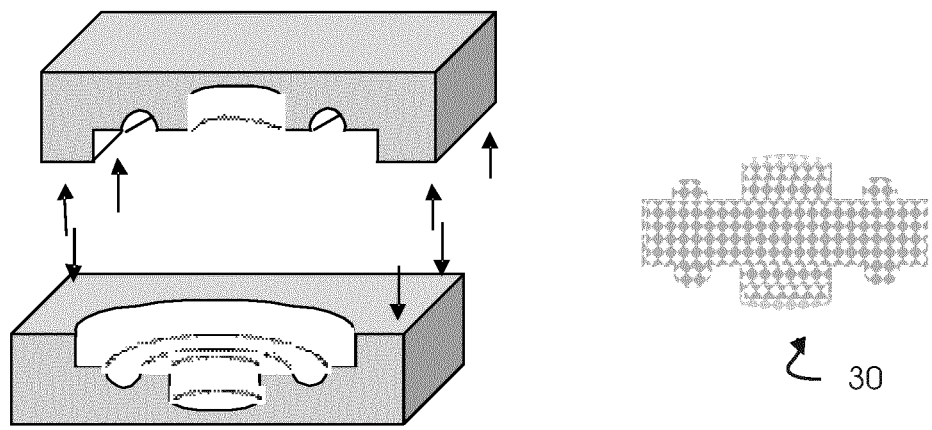
Figure 4:
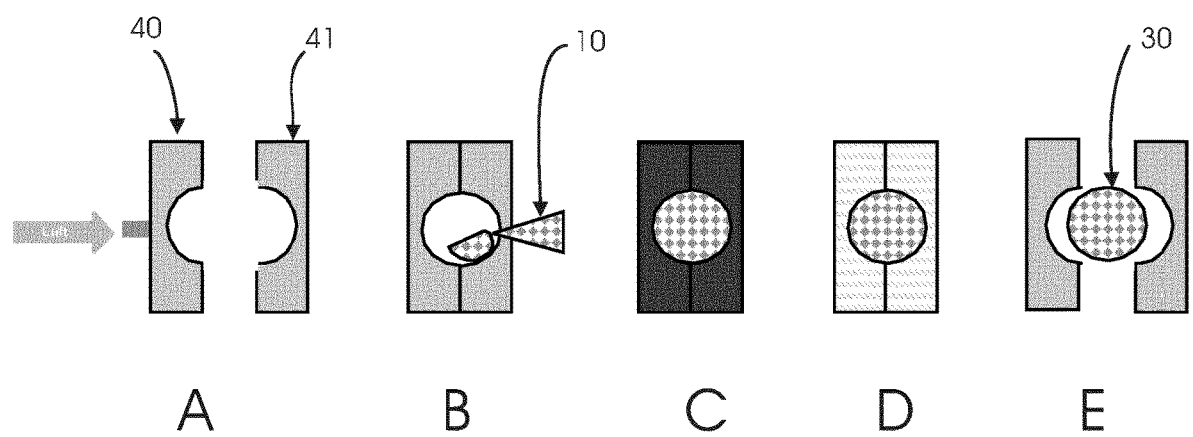

Further details, features and advantages of the subject matter of the invention result from the subclaims as well as from the following description of the associated drawings, in which—by way of example—several embodiments of the process according to the invention are shown. The drawings show:

FIG. 1 to FIG. 3 a schematic of the sequence of a manufacturing process of a molded article according to the invention according to a first embodiment; and FIG. 4 schematically shows the sequence of a manufacturing process of a molded article according to the invention in accordance with a second embodiment.

FIGS. 1 to 3 schematically show the sequence of a manufacturing process of a molded article according to the invention in accordance with a first embodiment. In this, in step 1, shown in FIG. 1, a molding compound 10 consisting of popcorn surrounded by polymer with possibly further binder is introduced into a cavity which is formed by two corresponding mold bodies 20 and 21. In step 2, shown in FIG. 2, heating is performed so that under the influence of temperature (and pressure formed under the influence of temperature) the molded article 30 is formed, which is then removed in step 3, shown in FIG. 3.

FIG. 4 schematically shows the sequence of a manufacturing process of a molded article according to the invention according to a second embodiment by means of an automatic molding machine. Here, the cavity formed by the two mold bodies 40 and 41 is first closed (step A), then the molding compound 10 is filled in under pressure (step B).

After heating under pressure (step C) and cooling (step D), the resulting molded article 30 can then be removed.

The invention is also explained by means of examples which are purely illustrative and are to be regarded as non-limiting.

The molded articles with different densities produced in the manner described above were examined with regard to their strength properties. The results are summarized in Table 1.

TABLE 1

Mechanical-technological properties of popcorn molded articles surrounded by a polymer layer of polypropylene (PP) or polyethylene (PE) as a function of bulk density

| Polymer | Density [Kg/m$^3$] | Bending force [N/mm$^2$] | QZ [kPa] | Compressive stress [kPa] | Thermal conductivity [W/(m * K)] |
|---|---|---|---|---|---|
| PP | 100 | 2.2 | 140 | 280-310 | 0.040 |
| PE |  | 1.8 | 180 | 295-320 |  |
| PP | 120 | 2.8 | 170 | 335 | 0.041 |
| PE |  | 2.3 | 210 | 355 |  |
| PP | 140 | 3.8 | 160 | 350 | 0.042 |
| PE |  | 2.5 | 230 | 372 |  |
| PP | 160 | 4.4 | 175 | 380 | 0.044 |
| PE |  | 2.7 | 255 | 388 |  |
| PP | 180 | 4.9 | 230 | 410 | 0.045 |
| PE |  | 2.9 | 290 | 400 |  |
| PP | 200 | 5.6 | 295 | 480 | 0.048 |
| PE |  | 3.1 | 330 | 420 |  |

A polypropylene-based polymer and a melamine-urea-formaldehyde (MUF) resin were used to produce flexible molded articles front popcorn granules. In the first stage, the polypropylene was sprayed 2% atro (based on the popcorn) onto the popcorn in a mixer. Then the material was dried at about 105° C. In the second process step, the material was conveyed in a mixing unit and glued with polymer using a MUF (66% solids) at a dosage of 5% atro on popcorn, and the material was introduced as a molding compound into the cavity, which is heated under pressure and conductive heat transfer. The cavity is then closed using a pressure piston. The pressure causes the molding compound to acquire the shape specified by the mold. In the final process step, the finished, flexible molded article is removed from the mold. Table 2 lists the mechanical and technological properties of these flexible molded articles.

TABLE 2

Mechanical-technological properties of popcorn molded
articles surrounded by a polymer layer a polypropylene (PP)
or polyethylene (PE) and glued with MUF as a function
of bulk density

| Polymer atro popcorn | Density [Kg/m³] | Bending force [N/mm²] | QZ [kPa] | Compressive stress [kPa] |
|---|---|---|---|---|
| PP 2% MUP 5% | 140 | 4.3 | 300 | 130-180 |
| PE: 2% MUF 5% | 160 | 4.9 | 380 | 170-220 |
| PP 2% MUF 5% | 140 | 6.0 | 350 | 150-170 |
| PP 2% MUF 5% | 160 | 6.8 | 420 | 180-230 |

For the production of molded articles from popcorn granules by dry steam, the popcorn granules were pretreated with a polymer (polyethylene) and urea-formaldehyde resin (UF, BASF Kaurit 350).

First, 1.5% polyethylene was applied to the popcorn granules. Then, the 66% urea-formaldehyde resin was applied to the popcorn granules treated in this way in the gluing unit. In the second step, the glued material was conveyed into the cavity by a negative pressure (vacuum) of 2.5 bar and cured by means of dry steam.

To generate the dry steam, wet steam was passed through a separator that eliminated about 98% of the original wet steam and converted it to about 99% dry steam. The temperature of the dry steam used here was >100° C.

Depending on the thickness and bulk density of the molded article, different amounts of dry steam were passed through the molded article for up to 90 seconds. The finished molded article was then removed from the cavity. Table 3 shows the mechanical properties of the molded articles produced by dry steam.

TABLE 3

Mechanical-technological properties of UF resin-bonded
molded articles with different densities and thicknesses after
crosslinking by means of hot dry steam of approx. 150° C.

| Polymer atro popcorn | Density [Kg/m³] | Thickness [mm] | QZ [kPa] |
|---|---|---|---|
| PE 1.5% UF 7% | 150 | 20 | 310 |
|  |  | 50 | 295 |
| PE 1.5% UF 7% | 120 | 20 | 275 |
|  |  | 50 | 255 |
| PE 1.5% UF 7% | 80 | 20 | 243 |
|  |  | 50 | 217 |

The individual combinations of the components and features from the embodiments already mentioned are exemplary; the interchange and substitution of these teachings with other teachings contained in this publication with the cited publications are also expressly contemplated. The skilled person will recognize that variations, modifications and other embodiments described herein may also occur without departing from the spirit and scope of the invention.

Accordingly, the above description is exemplary and is not to be considered limiting. The word "comprise" as used in the claims does not exclude other components or steps. The indefinite article "a" docs not exclude the meaning of a plural. The mere fact that certain dimensions are recited in mutually different claims does not make it clear that a combination of those dimensions cannot be used to advantage. The scope of the invention is defined in the following claims and their equivalents.

The invention claimed is:

1. A molded article made from a molding compound, the molding compound consisting of popcorn particles, a hydrophobic polymer, and a binder, wherein ≥95% by weight of the individual popcorn particles are surrounded by a hydrophobic polymer, and a binder, wherein the summed proportion of the hydrophobic polymer and binder is ≤20% (w/w) based on the total weight of the molded article.

2. The molded article according to claim 1, wherein the summed proportion of hydrophobic polymer and binder is ≤15% (w/w) based on the molded article.

3. The molded article according to claim 1, wherein the popcorn has a particle size distribution in which the fat content of the popcorn before processing is ≤10 wt %.

4. The molded article according to claim 1, wherein the proportion of hydrophobic polymer in the molded article in wt % based on the weight of the molded article is ≤5%.

5. The molded article according to claim 1, wherein the proportion of binder in the molded article (in % by weight based on the weight of the molded article) is ≤10%.

6. The molded article according to claim 1, wherein the hydrophobic polymer is selected from the group comprising polypropylene, polyethylene, polyvinyl chloride, polystyrene, polyacrylate, condensed aminoplast resins, polylactic acids (PLA), polyhydroxy acids, cellulose derivatives or mixtures thereof.

7. The molded article according to claim 1, wherein the binder is selected from urea-formaldehyde resin, melamine-formaldehyde resin, melamine-reinforced urea-formaldehyde resin, tannin-formaldehyde resin, phenol-formaldehyde resin, polymeric diphenyl-methane di-isocyanate, or mixtures thereof.

8. The molded article according to claim 1, wherein the ratio of binder to hydrophobic polymer (w/w) is from ≥1:1 to ≤4:1.

* * * * *